United States Patent
Wei et al.

(10) Patent No.: US 8,556,613 B2
(45) Date of Patent: Oct. 15, 2013

(54) INJECTION MOLD HAVING A MOLD CORE DETACHABLY MOUNTED IN A MOLD BASE

(75) Inventors: Dian-Hong Wei, Shenzhen (CN); Du-Xi Gao, Shenzhen (CN); Yong-Hong Liu, Shenzhen (CN); Yang-Liang Tian, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 121 days.

(21) Appl. No.: 13/337,428

(22) Filed: Dec. 27, 2011

(65) Prior Publication Data

US 2013/0045293 A1   Feb. 21, 2013

(30) Foreign Application Priority Data

Aug. 16, 2011   (CN) .......................... 2011 1 0234424

(51) Int. Cl.
    *B29C 45/36*   (2006.01)
(52) U.S. Cl.
    USPC ...................................... 425/190; 425/192 R
(58) Field of Classification Search
    USPC ...................................... 425/185, 190, 192 R
    See application file for complete search history.

(56) References Cited

U.S. PATENT DOCUMENTS

| | | | | |
|---|---|---|---|---|
| 4,202,522 A | * | 5/1980 | Hanas et al. | 249/102 |
| 4,959,002 A | * | 9/1990 | Pleasant | 425/192 R |
| 4,976,602 A | * | 12/1990 | Yamazaki | 425/188 |
| 5,261,602 A | * | 11/1993 | Brent et al. | 239/132.3 |
| 5,350,289 A | * | 9/1994 | Martin | 425/190 |
| 8,297,963 B2 | * | 10/2012 | Yang | 425/185 |

* cited by examiner

*Primary Examiner* — Tim Heitbrink
(74) *Attorney, Agent, or Firm* — Altis & Wispro Law Group, Inc.

(57) ABSTRACT

An injection mold includes a mold base defined with a sliding slot, a mold core detachably mounted in the mold base, and a plurality of securing devices. The mold base includes an upper mold base and a lower mold base. The mold core includes an upper mold core and a lower mold core detachably connected with the upper mold core. The mold core defines a slider. The slider slides in the sliding slot of the mold base to move the mold core in or out of the mold base. The upper mold core defines a first securing groove, and the lower mold core defines a second securing groove. The securing devices are mounted in the upper mold base and the lower mold base. The securing devices secure the first and the second securing grooves, allowing the mold core to attach to the mold base.

14 Claims, 8 Drawing Sheets

INJECTION MOLD HAVING A MOLD CORE DETACHABLY MOUNTED IN A MOLD BASE

BACKGROUND

1. Technical Field

The present disclosure relates to an injection mold.

2. Description of Related Art

Many injection molds are 2-plate molds. The 2-plate mold commonly includes a pair of mold bases and a mold core assembled in the two mold bases. Typically, the mold bases only fit with one kind of mold core, thus different mold cores may need different mold bases, resulting in a high cost of the injection mold.

Therefore, there is room for improvement within the art.

BRIEF DESCRIPTION OF THE FIGURES

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
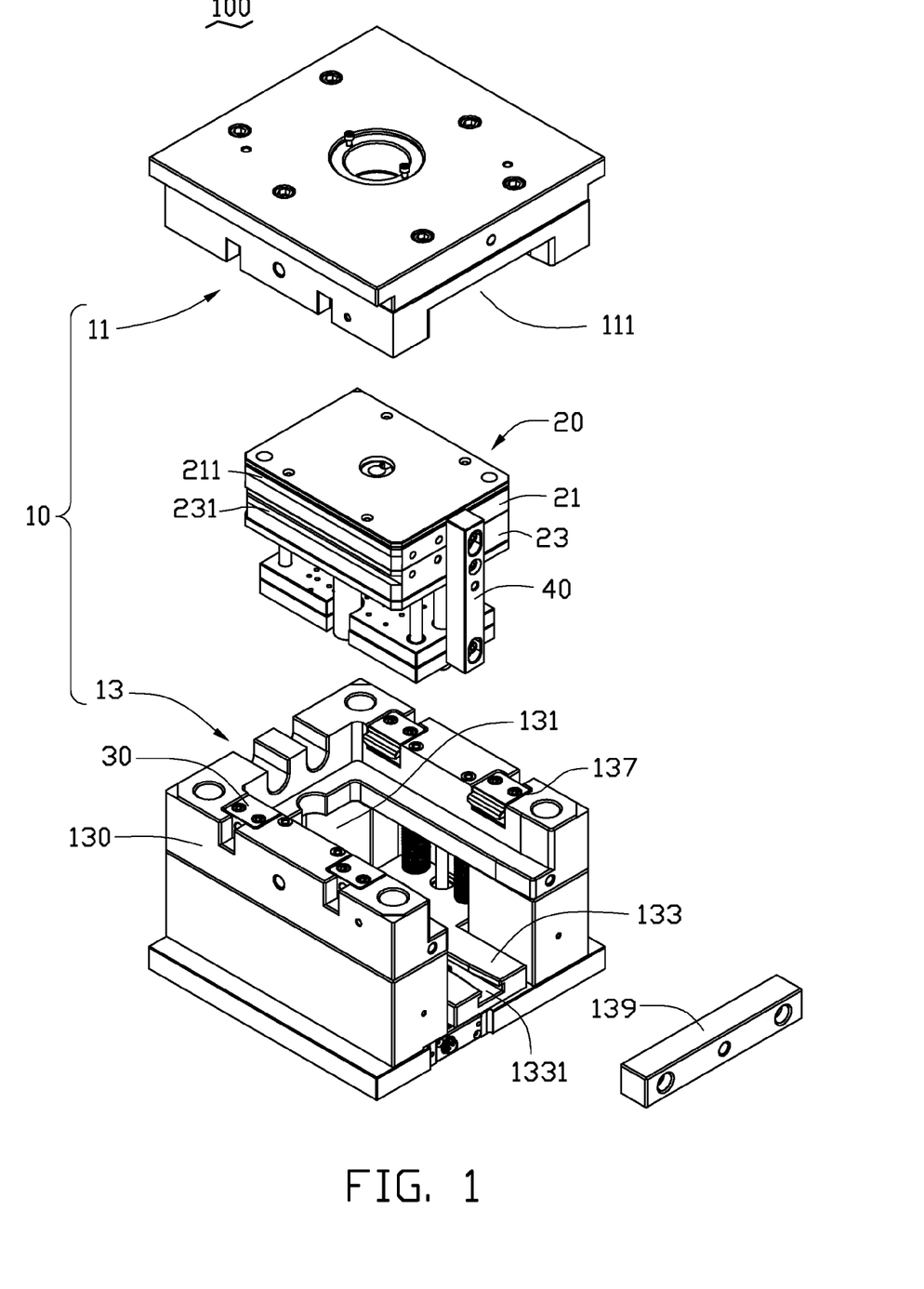
FIG. 1 is an exploded view of one embodiment of an injection mold.
Figure 2:
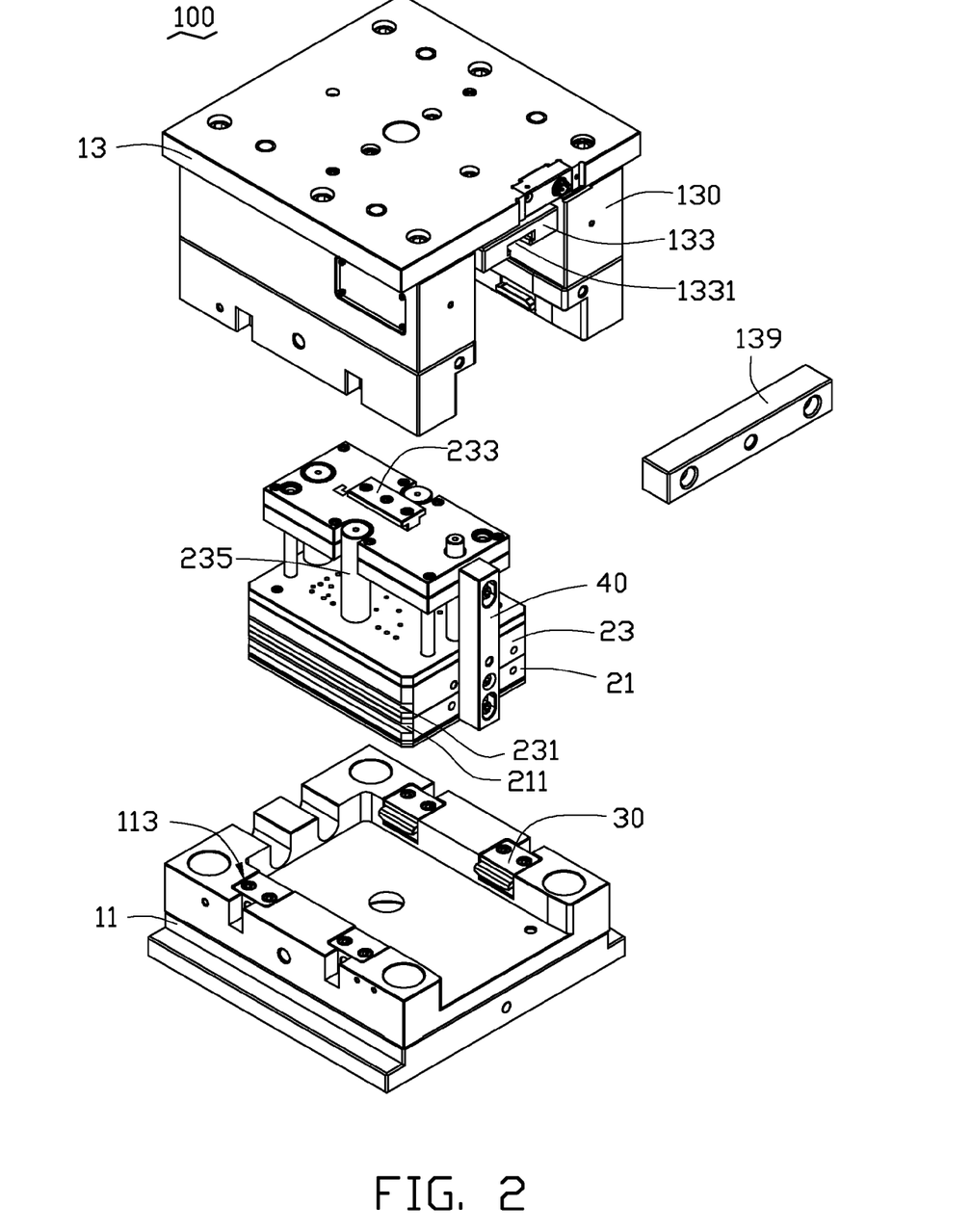
FIG. 2 is another exploded view of the injection mold shown in FIG. 1.

FIGS. 1 and 2 show an injection mold 100 in one embodiment includes a mold base 10 and a mold core 20 detachably mounted to the mold base 10. The mold base 10 includes an upper mold base 11 and a lower mold base 13 mating with the upper mold base 11. The upper mold base 11 defines a first receiving space 111, and the lower mold base 13 defines a second receiving space 131. The first receiving space 111 mates with the second receiving space 131 to receive the mold core 20.

The mold 100 further includes a plurality of securing devices 30. The securing devices 30 are respectively mounted in the upper mold base 11 and the lower mold base 13 to secure the mold core 20 in the mold base 10. The quantity of the securing devices 30 in one embodiment is eight.

Referring to FIGS. 1 and 2 again, the upper mold base 11 defines four first latching grooves 113 therein. Each first latching groove 113 is mounted with a securing device 30. The securing device 30 may be attached in the first latching groove 113 by screws, for example.

Figure 3:
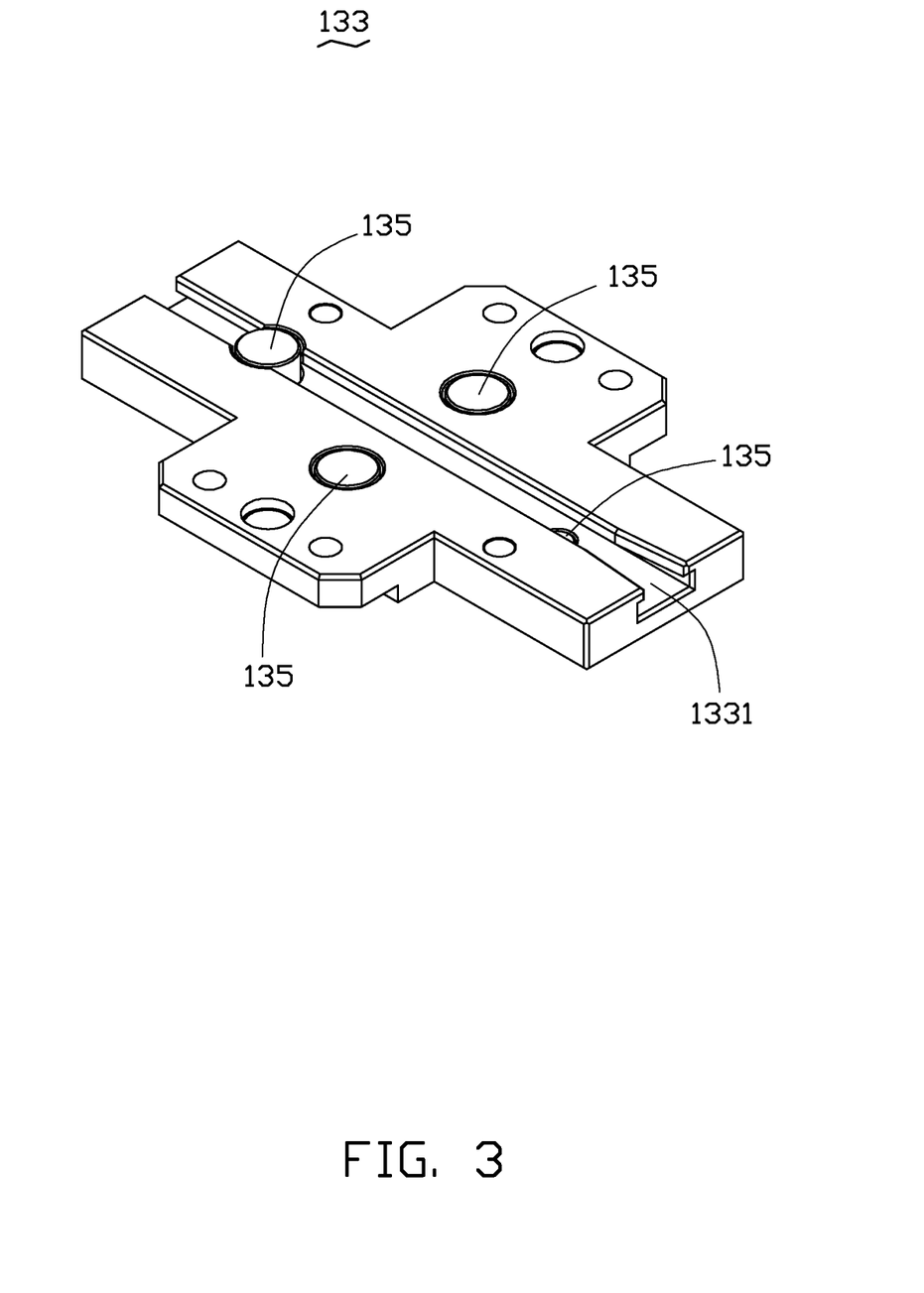
FIG. 3 is an isometric view of a bottom board of the injection mold shown in FIGS. 1 and 2.

The lower mold base 13 includes a bottom board 133 received in the second receiving space 131, and two sidewalls 130 located opposite to each other and around the second receiving space 131. The bottom board 133 defines a sliding slot 1331 (see FIG. 3). The width of the sliding slot 1331 gradually decreases from an outer end of the second receiving space 131 to the inside of the second receiving space 131. The bottom board 133 is defined with a plurality of support columns 135 through the bottom board 133. Each sidewall 130 defines two second latching grooves 137 therein. Each second latching groove 137 is mounted with a securing device 30. The securing device 30 may be attached in the second latching groove 137 by screws, for example.

The mold core 20 includes an upper mold core 21 and a lower mold core 23. A connecting rod 40 is provided to connect the upper mold core 21 and the lower mold core 23, allowing the upper mold core 21 and the lower mold core 23 to integrate. The connecting rod 40 may be attached to the upper mold core 21 and the lower mold core 23 by screws. The upper mold core 21 defines two first securing grooves 211 in the two opposite sidewalls of the upper mold core 21. The lower mold core 23 defines two second securing grooves 231 in the two opposite sidewalls of the lower mold core 23.

The lower mold core 23 is defined by a slider 233. The slider 233 is mounted to and slides along the sliding slot 1331 of the bottom board 133, allowing the mold core 20 to move in or move out from the mold base 10. The slider 233 of the lower mold core 23 can be changed. The lower mold core 23 is defined by a plurality of resisting rods 235 through the lower mold core 23. When the mold core 20 is located in the mold base 10, each resisting rod 235 connects with a support column 135 and resists each other, preventing the mold core 20 and the mold base 10 form deformation. In one embodiment, the quantities of the resisting rods 235 and the support columns 135 are both four.

Figure 4:
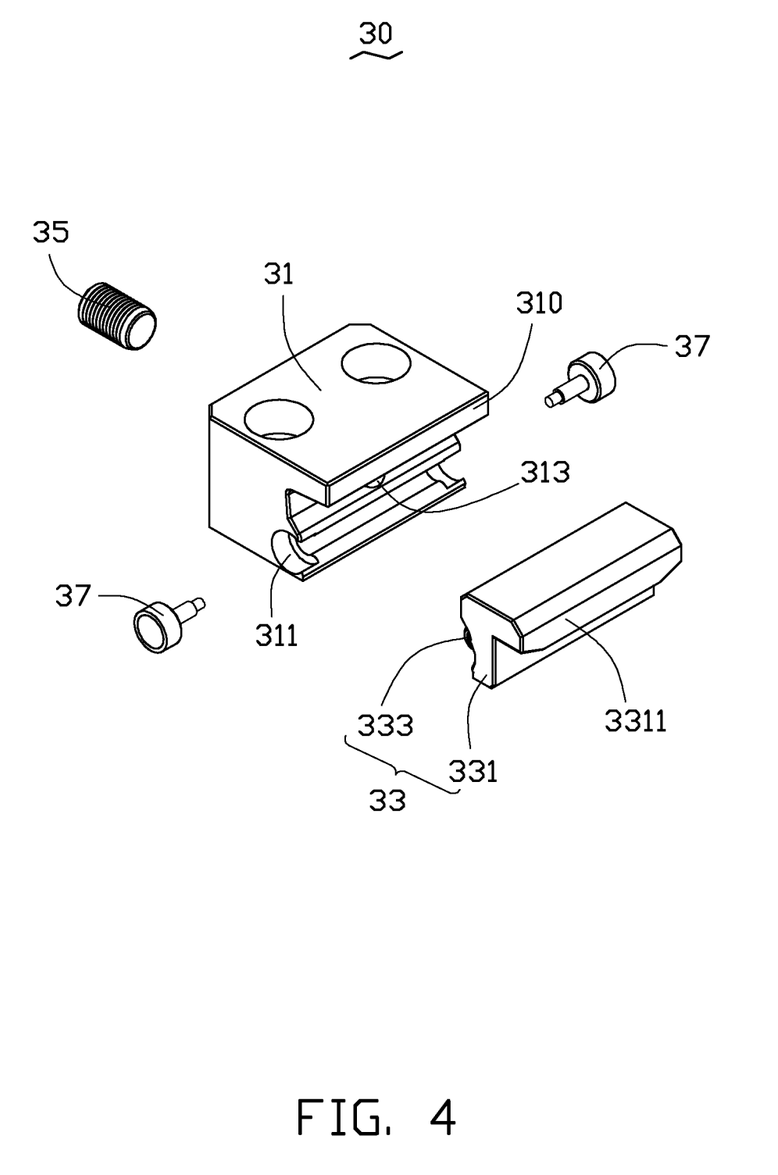
FIG. 4 is an exploded view of a securing device of the injection mold shown in FIGS. 1 and 2.
Figure 5:
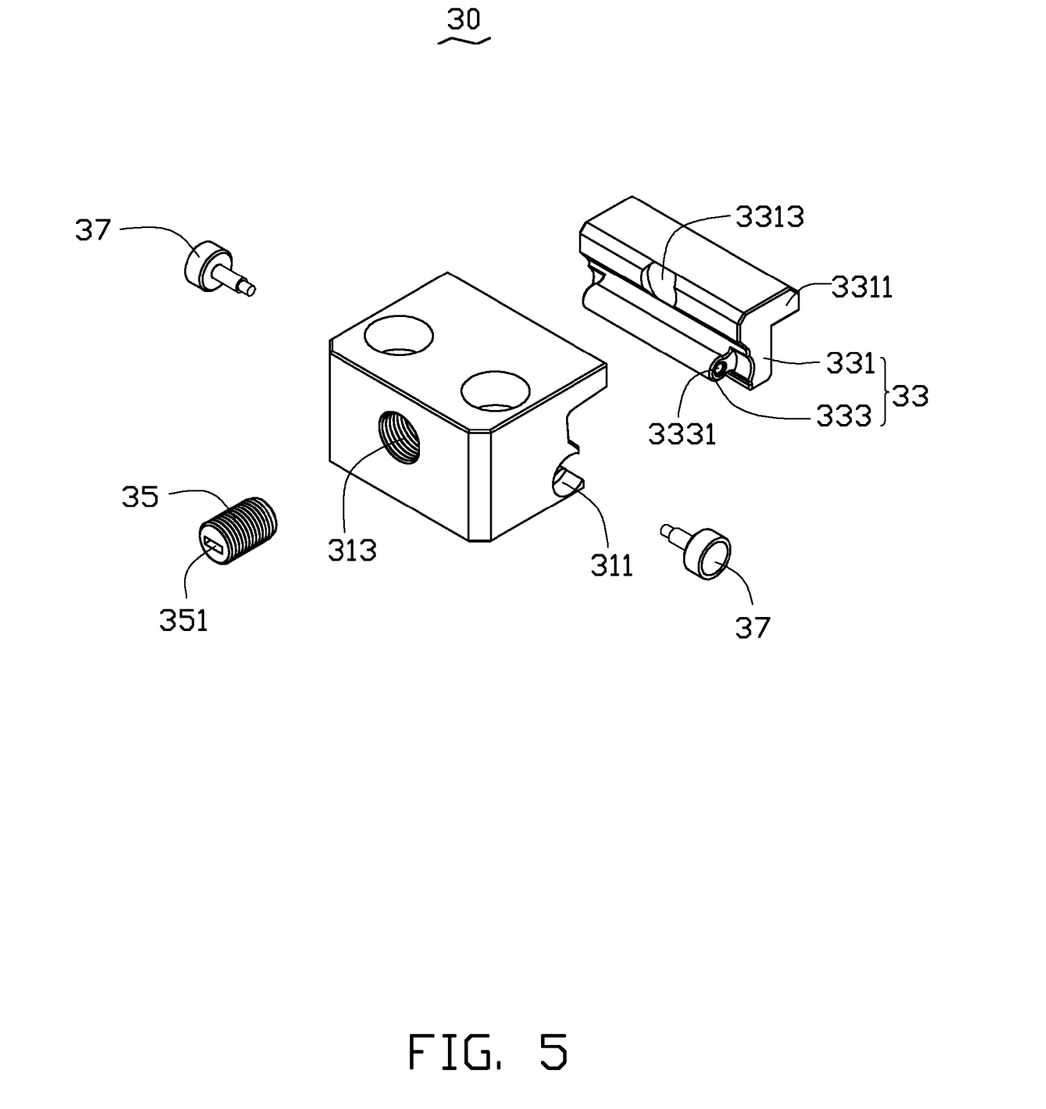
FIG. 5 is another exploded view of the securing device of FIG. 4.
Figure 6:
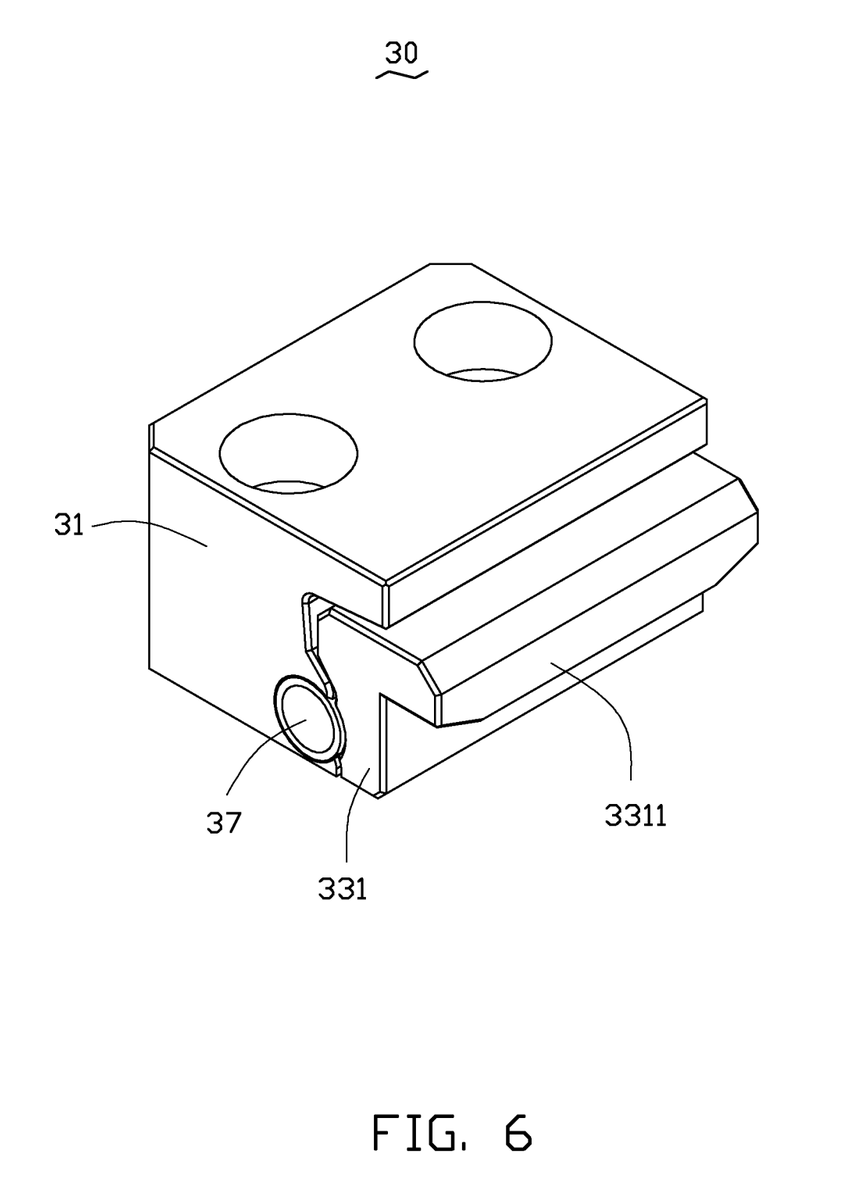
FIG. 6 is an assembled view of the securing device of FIGS. 4 and 5.

Referring to FIGS. 4, 5, and 6, each securing device 30 includes a securing block 31, a pressing block 33, and a pushing block 35.

The pressing block 33 includes a main body 331 and a rotating shaft 333 assembled to the main body 331. The rotating shaft 333 is located near the end of one side of the main body 331. The rotating shaft 333 defines two screw holes 3331 in the two ends of the rotating shaft 333. The main body 331 includes a resisting portion 3311 protruding from the side opposite to the rotating shaft 333. The resisting portion 3311 latches to the first securing grooves 211 or the second securing grooves 231. The main body 331 further defines a receiving groove 3313 adjacent to and upon the rotating shaft 333, on a same side of the main body 331 as the rotating shaft 333.

The securing block 31 includes a mounting sidewall 310. The mounting sidewall 310 defines a mating groove 311 mating to the rotating shaft 333, allowing the rotating shaft 333 to mate in the mating groove 311. The shape of the mounting sidewall 310 mates with the shape of the sidewall of the pressing block 33 formed with the rotating shaft 333. When the rotating shaft 333 engages in the mating groove 311, two securing screws 37 may be provided to be assembled in the two screw holes 3331. The assembly of the securing screws 37 and screw holes 3331 allows the rotating shaft 333 to be rotatably mounted to the mating groove 311, and allows the pressing block 33 to be rotatably mounted to the securing block 31.

The securing block 31 defines a through hole 313 through the securing block 31. The through hole 313 can be a threaded hole. The through hole 313 receives the pushing block 35. The pushing block 35 has an end that can be received in the receiving groove 3313 of the pressing block 33. Another end of the pushing block 35 is defined with a notch 351. The pushing block 35 is also threaded to mate the through hole 313. A screw-driver may be used to mate the notch 351 and screw the pushing block 35 to engage in the receiving groove 3313 of the pressing block 33, causing the rotating shaft 333 to rotate and the main body 331 to detach from the securing block 31. As the main body 331 detaches from the securing block 31, the resisting portion 3311 is pressed into the first securing groove 211 and the second securing groove 231.

A stop rod 139 is detachably mounted to the two sidewalls 130 of the lower mold base 13. Before the mold core 20 slides into the mold base 10, the stop rod 139 is unloaded from the two sidewalls 130. After the mold core 20 is slid into the mold base 10, the stop rod 139 is mounted to the two sidewalls 130 of the lower mold base 13.

During assembly of the mold base 10, the securing devices 30 are assembled first. The rotating shaft 333 is mounted to the mating groove 311, the two securing screws 37 are assembled into the two screw holes 3331, thereby rotatably assembling the pressing block 33 to the securing block 31. The assembled securing devices 30 are then mounted in the upper mold base 11 and the lower mold base 13. The resisting portions 3311 of the pressing blocks 33 are all mounted toward the first receiving space 111 and the second receiving space 131. The upper mold base 11 and the lower mold base 13 are then assembled.

Figure 7:
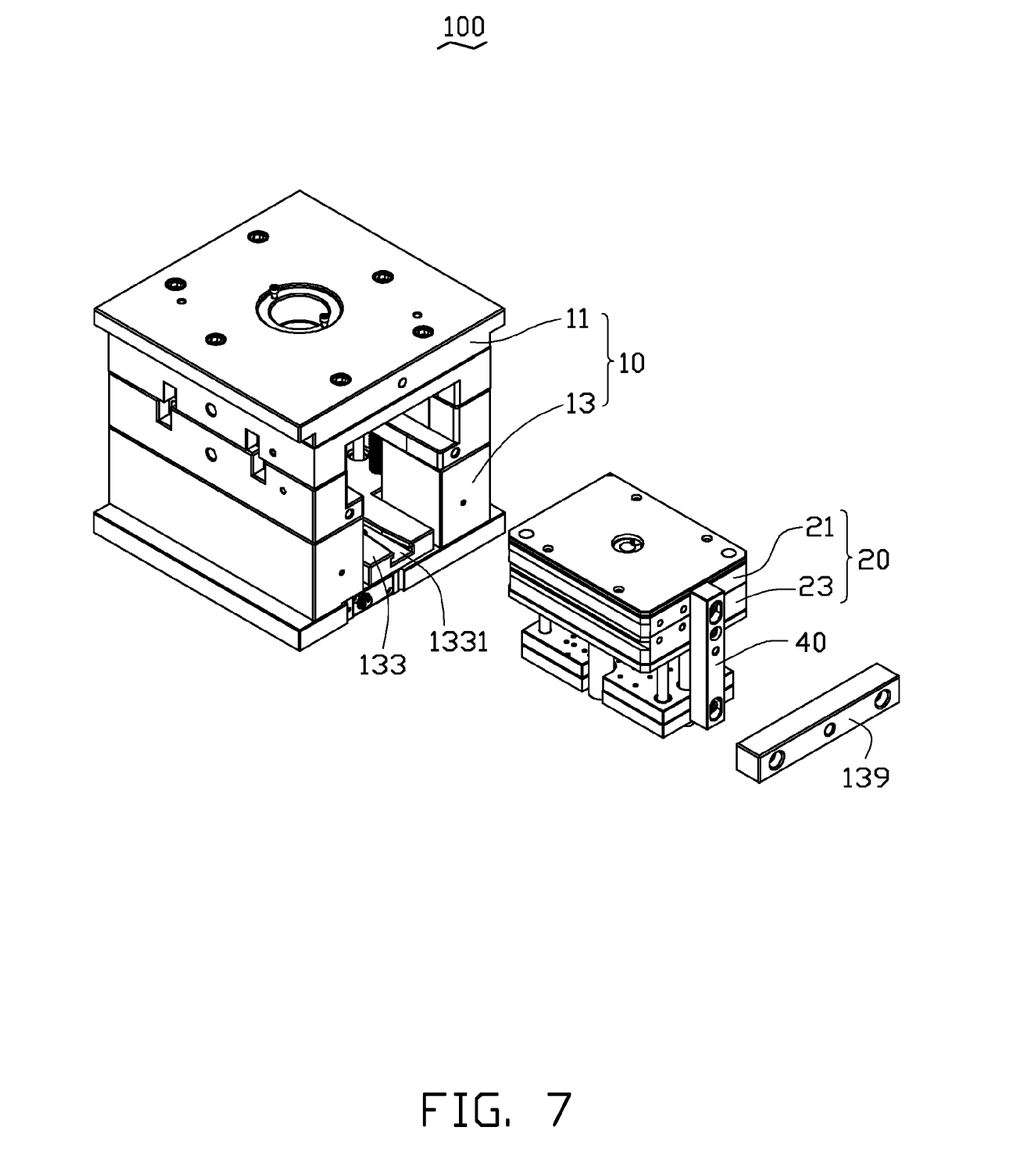
FIG. 7 is an isometric view of one embodiment of incorporating the injection mold shown in FIGS. 1 and 2.
Figure 8:
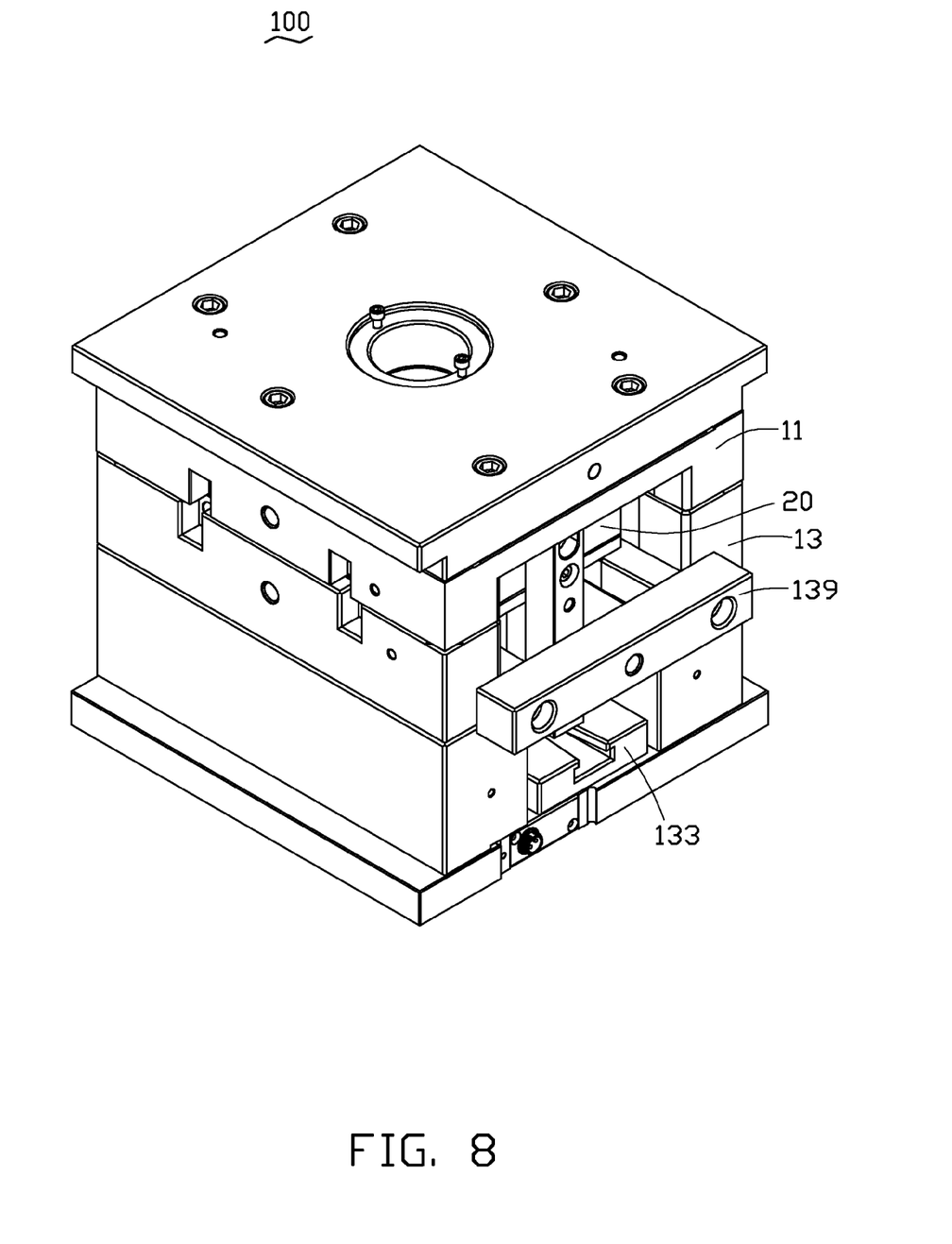
FIG. 8 is an isometric view of an incorporated injection mold of FIGS. 1 and 2.

Referring to FIGS. 7 and 8, to mount the mold core 20 to the mold base 10, the upper mold core 21 and the lower mold core 23 are first incorporated by the connecting rod 40. The slider 233 of the mold core 20 slides into the sliding slot 1331, allowing the mold core 20 move into the mold base 10. At this time, the resisting portions 3311 of the securing devices 30 are opposite to the first securing grooves 211 and the second securing grooves 231 of the mold core 20. The pushing block 35 is screwed away from the through hole 313 and further pushing the pressing block 33 apart from the securing block 31, allowing the resisting portions 3311 to be pressed and latched in the first securing grooves 211 and the second securing grooves 231 of the mold core 20. As such, the mold core 20 is assembled in the mold base 10. The connecting rod 40 is unloaded from the upper mold core 21 and the lower mold core 23. Lastly, the upper mold core 21 and the lower mold core 23 are respectively attached to the upper mold base 11 and the lower mold base 13.

To remove the mold core 20 out of the mold base 10, the pushing block 35 may be released, no longer pressing the pressing block 33. The securing devices 30 no longer press the mold core 20. The mold core 20 then slides out of the sliding slot 1331 to be detached from the mold base 10.

As discussed above, in the embodiment, the mold base 10 mates with different mold cores, only needing to mount the slider on each mold core and define securing grooves in the mold core so that many mold bases are saved. Furthermore, the mold core 20 moves into the mold base 10 quickly, decreasing mounting times of the mold core 20 compared to an ordinary mold.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. An injection mold, comprising:
a mold base comprising an upper mold base and a lower mold base, the mold base defining a sliding slot;
a mold core detachably mounted in the mold base, the mold core comprising an upper mold core and a lower mold core detachably connected with the upper mold core, the mold core being defined with a slider, the slider sliding in the sliding slot of the mold base to move the mold core in or out of the mold base, the upper mold core defining a first securing groove, the lower mold core defining a second securing groove; and
a plurality of securing devices mounted in the upper mold base and the lower mold base, the securing devices securing the first and the second securing grooves, allowing the mold core to attach to the mold base.

2. The mold as claimed in claim 1, wherein the upper mold base defines a first receiving space, the lower mold base defines a second receiving space, and the first receiving space mates with the second receiving space to receive the mold core.

3. The mold as claimed in claim 2, wherein the lower mold base is defined with a bottom board in the second receiving space, the sliding slot is defined in the bottom board, the slider is defined on the lower mold core, and the slider is movably mounted in the sliding slot.

4. The mold as claimed in claim 3, wherein the lower mold base is defined with a plurality of support columns through the bottom board, the lower mold core is defined with a plurality of resisting rods, each of the support columns resists each of the resisting rods when the mold core is assembled in the mold base.

5. The mold as claimed in claim 2, wherein the upper mold base and the lower mold base respectively define a plurality of latching grooves, the securing devices are mounted in the latching grooves.

6. The mold as claimed in claim 5, wherein the upper mold base defines four first latching grooves, each of the first latching grooves is mounted with a securing device by screws.

7. The mold as claimed in claim 5, wherein the lower mold base comprises two sidewalls located opposite and around the second receiving space, each of the sidewalls defines two second latching grooves, each of the second latching grooves is mounted with a securing device by screws.

8. The mold as claimed in claim 1, wherein each of the securing devices comprises a securing block, a pressing block, and a pushing block, the securing block defines a mating groove and a through hole through the securing block, the through hole receives the pushing block, the pressing block comprises a main body and a rotating shaft assembled to the main body, the rotating shaft rotatably mates with the mating groove, and the pushing block moves along the through hole to push the main body away from the securing block to press the mold core.

9. The mold as claimed in claim 8, wherein the main body comprises a resisting portion protruding from the side opposite to the rotating shaft, the upper mold core defines two first securing grooves on two opposite sidewalls, the lower mold core defines two second securing grooves on two opposite sidewalls of the lower mold core, the resisting portion of the pressing block mounted in the upper mold base mates with the first securing groove, and the resisting portion of the pressing block mounted in the lower mold base mates with the second securing groove.

10. The mold as claimed in claim 8, wherein the main body defines a receiving groove, the receiving groove is adjacent to the rotating shaft, the receiving groove and the rotating shaft are located on a same side of the main body, and the receiving groove mates with one end of the pushing block.

11. The mold as claimed in claim 8, wherein the rotating shaft defines two screw holes at the two ends, and when the rotating shaft is received in the mating groove, two securing screws are assembled in the two screw holes, allowing the rotating shaft to be rotatably assembled to the mating groove.

12. The mold as claimed in claim 10, wherein the through hole is a threaded hole, and the pushing block is also threaded to mate with the through hole, screwing the pushing block to push the pushing block away from the through hole and engage in the receiving groove of the pressing block, allowing the rotating shaft to rotate and the main body to move away from the securing block to press the mold core.

13. The mold as claimed in claim 1, wherein a connecting rod is detachably mounted on the upper mold core and the lower mold core to connect the upper and lower mold cores.

14. An injection mold, comprising:
a mold base comprising an upper mold base and a lower mold base, the mold base defining a sliding slot and a receiving space;
a mold core detachably assembled in the mold base, the mold core comprising an upper mold core and a lower mold core detachably connected with the upper mold core, the mold core being defined with a slider mating the sliding slot, the slider sliding in the sliding slot of the mold base to move the mold core in or out of the receiving space, the upper mold core defining a first securing groove, the lower mold core defining a second securing groove; and
a plurality of securing devices assembled in the upper mold base and the lower mold base, the securing devices securing with the first and the second securing grooves, allowing the mold core to be attached to the mold base.

* * * * *